United States Patent [19]

Yamauchi

[11] Patent Number: 5,266,739
[45] Date of Patent: Nov. 30, 1993

[54] CHIP ELECTRONIC DEVICE WITH A RESIN HOUSING AND MANUFACTURING PROCESS THEREOF

[75] Inventor: Keishiro Yamauchi, Nagaokakyo, Japan

[73] Assignee: Murata Manufacturing Co., Ltd., Nagaokakyo, Japan

[21] Appl. No.: 840,926

[22] Filed: Feb. 25, 1992

[30] Foreign Application Priority Data

Feb. 28, 1991 [JP] Japan .................. 3-033921

[51] Int. Cl.⁵ .................. H01L 23/28; B29B 13/00
[52] U.S. Cl. .................. 174/52.2; 336/96; 264/272.11; 264/271.1; 257/787
[58] Field of Search .................. 336/96; 361/303, 304, 361/305, 306, 308, 309; 174/52.2, 52.3, 52.4; 357/72, 73; 264/271.1, 272.11, 272.18, 272.19, 272.2; 257/787

[56] References Cited

U.S. PATENT DOCUMENTS

| | | | |
|---|---|---|---|
| 3,550,228 | 12/1970 | Asscher | 174/52.2 |
| 4,064,472 | 12/1977 | Gunewardena et al. | 336/65 |
| 4,365,284 | 12/1982 | Tanaka | 361/395 |
| 4,490,706 | 12/1984 | Satou et al. | 336/96 |
| 4,498,067 | 2/1985 | Kumokawa et al. | 336/65 |
| 4,571,662 | 2/1986 | Conquest et al. | 361/306 |
| 4,879,804 | 11/1989 | Chiang | 29/605 |
| 4,939,494 | 7/1990 | Masuda et al. | 336/96 |
| 5,034,854 | 7/1991 | Matsumura et al. | 361/396 |

Primary Examiner—Leo P. Picard
Assistant Examiner—Bot Ledynh
Attorney, Agent, or Firm—Burns, Doane, Swecker & Mathis

[57] ABSTRACT

A chip electronic device wherein an electronic element such as an inductor and capacitor, and terminals are covered with a resin housing. Plated lower surfaces and edges of the terminals show on a bottom and sides of a housing respectively. The lower surfaces of the terminals are soldered onto conductive patterns of a printed wiring board, and fillets of solder are formed at the edges of the terminals.

4 Claims, 4 Drawing Sheets

CHIP ELECTRONIC DEVICE WITH A RESIN HOUSING AND MANUFACTURING PROCESS THEREOF

BACKGROUND OF THE INVENTION

1. Field of the Invention

The present invention relates to a chip electronic device produced by housing a compact electronic element such as an inductor, a capacitor and a resistor with resin and a manufacturing process thereof.

2. Description of Related Art

When a chip electronic device is mounted on a printed wiring board, in general, it is known that whether soldering has been done sufficiently is decided by checking visually whether a fillet of solder is formed between an external terminal of the chip and a conductive pattern of the printed wiring board. To check the soldering condition surely in this way, the fillet needs to be formed on a side of the chip electronic device. As for a chip wherein external terminals are formed by punching a strip into a specified shape, the easiest method of forming a fillet which can be checked from outside is forming the fillet on cut surfaces which are made when the external terminals are separated from the strip. The terminals show on sides of a housing of the electronic element. The external terminals, after separated from the strip, are plated in order to improve solderability before an electronic element is mounted thereon. However, since the cut surfaces are formed after the plating, the cut surfaces are not plated and easy to be oxidized by heat generated during cutting or during soldering of the electronic element onto the external terminals. Thus, the solderability of the cut surfaces are deteriorated, and it becomes difficult to form the fillet of solder thereon.

To solve this problem, the external terminals are bent so that plated sides of the terminals show on the sides of the housing, or the cut surfaces are plated again separately to avoid oxidation. However, these bending or extraplating helps to raise a production cost.

SUMMARY OF THE INVENTION

An object of the present invention is to provide a chip electronic device which has a fillet of solder surely on a side of a housing, the fillet of solder being formed without bending nor extra-plating of terminals after molding of the housing and separation of the terminals from a strip.

Another object is to provide a manufacturing process of the chip electronic device.

In order to attain the objects, a chip electronic device according to the preset invention is manufactured by forming and plating terminals and exposing their lower surfaces and edges on a bottom and sides of a resin housing covering an electronic element.

The terminals of the chip electronic device are soldered at their bottom side onto conductive patterns of a printed wiring board or the like. At that time, since the edges of the terminals which show on the sides of the housing are plated as the lower surfaces of the terminals are, a fillet can be easily formed thereon when soldering. Acceptability of the soldering is decided by checking a forming condition of the fillet visually.

In other word, according to the present invention, bending and extra-plating of the terminals after separation of the terminals from the strip, which have been conventionally carried out in order to facilitate checking of the soldering, are no longer necessary, and the production cost of the chip electronic device can be reduced.

BRIEF DESCRIPTION OF THE DRAWINGS

These and other objects and features of the present invention will become apparent from the following description with reference to the accompanying drawings, in which.

DETAILED DESCRIPTION OF THE PREFERRED EMBODIMENTS

Figure 1:
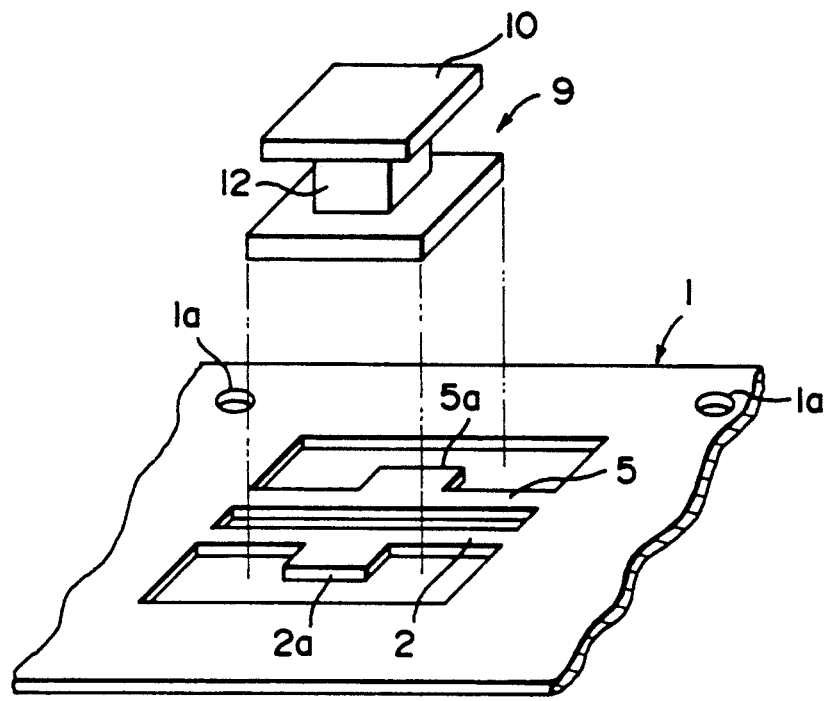
FIG. 1 is a perspective view which shows a process of mounting an electronic element on external terminals.

The description of preferred embodiments according to the present invention is given below, referring to the drawings.

The description below is for the case that the present invention is applied to a chip inductor.

As shown in FIG. 1, pairs of external terminals 2 and in a specified shape are formed consecutively by punching a lengthy strip 1 at regular intervals. FIG. 1 shows only one pair of the external terminals 2 and 5. The external terminals 2 and 5 protrude their center portions outward. The center portions of the terminals 2 and 5 are protruded by such lengths that the edges 2a and 5a of the terminals 2 and 5 will be exposed flush with sides of the housing 16 (shown in FIG. 2).

After the punching process, surfaces of the external terminals 2 and 5 are plated with tin or the like. An about 0.3 mm thickness conductive metal plate such as copper, brass and monel is used as the strip 1. The strip 1 is conveyed by a conveying apparatus (not shown) and adjusted by pilot holes 1a which are provided at uniform intervals on an edge of the strip 1.

An inductor element 9 is composed of a core 10 and a coil 12 which is wound around a body of the core 10. Electrodes 14a and 14b are provided at a bottom of the core 10 (shown in FIG. 5), and both ends of the coil 12 are connected electrically with the electrodes 14a and 14b.

Figure 2:
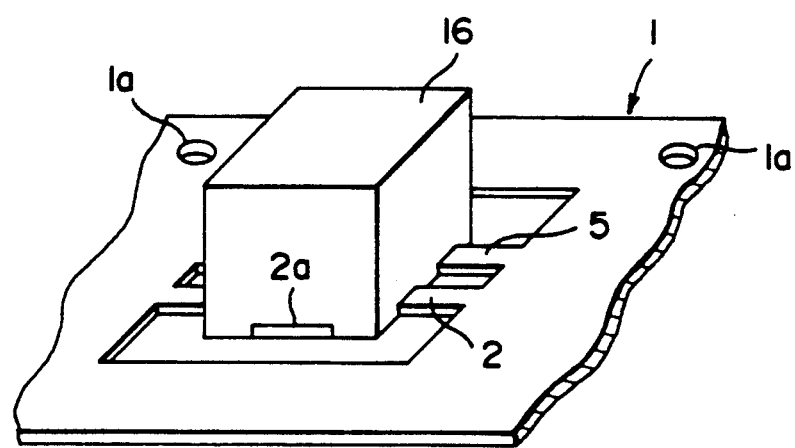
FIG. 2 is a perspective view of the electronic element with a resin housing.
Figure 5:
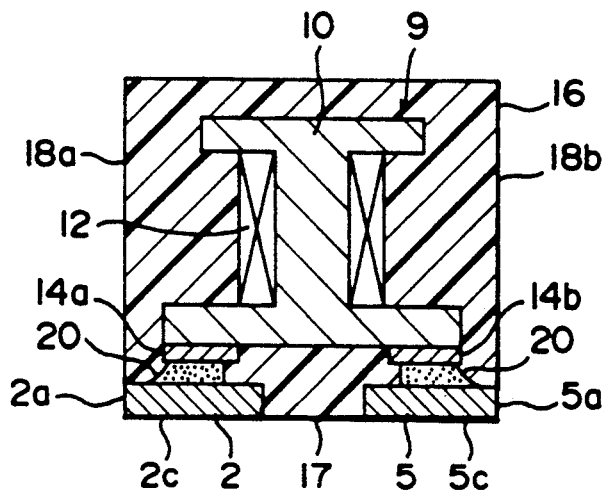
FIG. 5 is a vertical sectional view of the chip electronic device shown in FIG. 3, taken along a line X—X'.

The inductor element 9 is mounted on the external terminals 2 and 5 which are prepared in the above-mentioned process In other words, the electrodes 14a and 14b of the inductor element 9 are fixed on and connected electrically with the external terminals 2 and 5 respectively via solder 20 (refer to FIG. 5). Then the inductor element 9 and the external terminals 2 and 5 are inserted into a mold for resin molding (not shown). Then a resin is injected into the mold and forms a housing 16 therein. In this way, as shown in FIG. 2, the inductor element 9 and the external terminals 2 and 5 are covered with the housing 16. In this state, the edges 2a and 5a and lower surfaces 2c and 5c of the external terminals 2 and 5 (refer to FIG. 5) are exposed flush with the sides and the bottom of the housing 16 respectively. After the molded resin becomes stiff, a flash (a part protruded from the housing 16) is cut, and then the chip inductor is separated from the strip 1.

Figure 3:
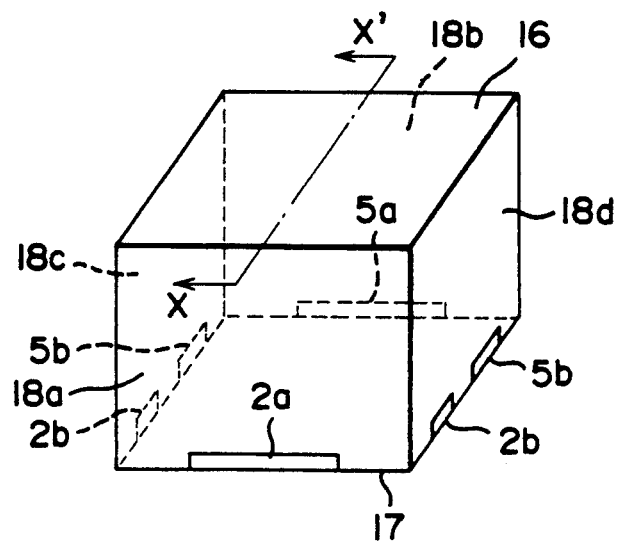
FIG. 3 is a perspective view which shows an appearance of a chip electronic device comprising the electronic element.
Figure 4:
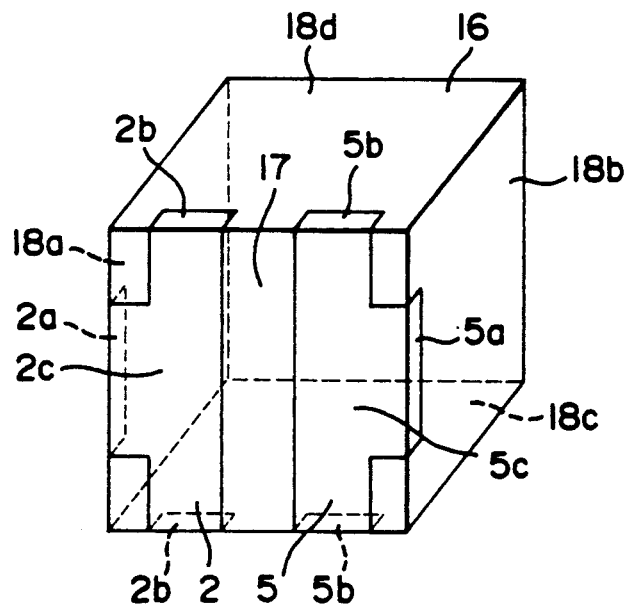
FIG. 4 is a perspective view of the chip electronic device from a bottom side.

FIGS. 3, 4 and 5 show the chip inductor after separated from the strip 1. The lower surfaces 2c and 5c of the external terminals 2 and 5 are exposed flush with the bottom 17 of the chip inductor. Also, the edges 2a and 5a of the external terminals 2 and 5 are exposed flush with mutually opposite sides 18a and 18b of the chip inductor, adjoining to the bottom 17. In the same way, edges 2b and 5b of the external terminals 2 and 5 which are cut after resin molding show on the other mutually opposite sides 18c and 18d. Since the edges 2a and 5a and the lower surfaces 2c and 5c of the external terminals 2 and 5 are cut and plated before molding, these are not oxidized by the heat generated during the final cutting of the terminals 2 and 5 or during the soldering of the inductor element 9 onto the external terminals 2 and 5. Therefore, the edges 2a and 5a and the lower surfaces 2c and 5c have good solderability. Especially when the chip inductor is soldered onto the conductive patterns of the printed wiring board or the like, the fillet of solder is easily and surely formed at the edges 2a and 5a. The acceptability of the soldering is decided by checking the forming condition of the fillet visually.

On the other hand, since the cut edges 2b and 5b are easily oxidized by the heat generated during the final cutting or during the soldering of the inductor element 9 onto the external terminals 2 and 5, these are not used for soldering the chip inductor onto the printed wiring board.

Figure 6:
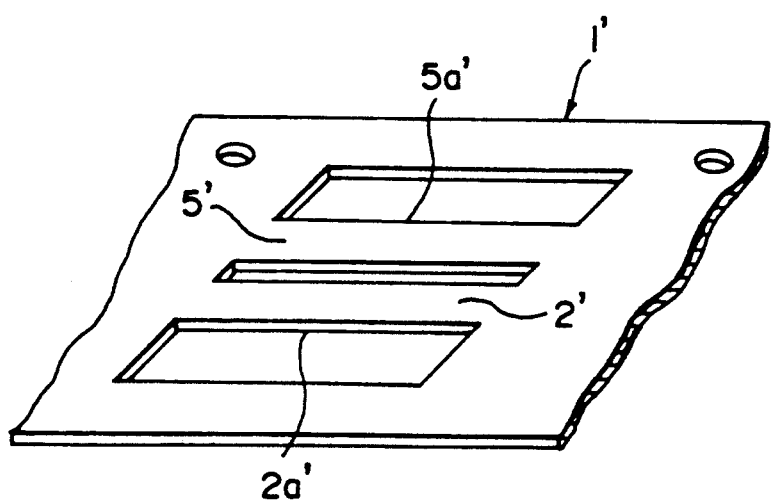
FIG. 6 is a perspective view of another shape of terminals after punching a strip.

FIG. 6 shows another shape of external terminals. External terminals 2' and 5' are shaped like straight plates and formed by punching a strip 1'. Edges 2a' and 5a' of the external terminals 2' and 5' are not protruded like the edges 2a and 5a shown in FIG. 1. Therefore, when a chip comprising an electronic element and the external terminals 2' and 5' is produced, the edges 2a' and 5a' of the external terminals 2' and 5' are exposed flush with sides of a housing 16' from one end to the other (refer to FIG. 7).

Figure 7:
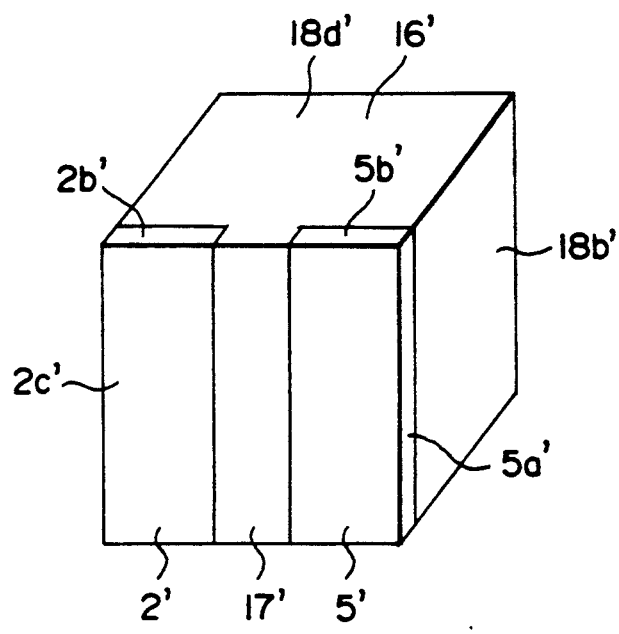
FIG. 7 is a perspective view of an electronic element which is mounted on the terminals shown in FIG. 6 and covered with a resin housing.

In FIGS. 6 and 7, parts and portions corresponding to the ones shown in FIGS. 1 through 5 are provided with the same numbers and alphabets with ['] marks.

Although the present invention has been described in connection with the preferred embodiments above, it is to be noted that various changes and modifications are apparent to a person skilled in the art. Such changes and modifications are to be understood as being within the scope of the present invention.

Especially, detailed shapes of the external terminals and the housing are optional.

What is claimed is:

1. A chip electronic device with a resin housing comprising:
    an electronic element;
    a terminal which is formed by punching a strip into a specified shape having at least one protruded edge and plated, the terminal being electrically connected with an electrode of the electronic element; and
    a resin housing which houses the electronic element and the terminal such that a plated lower surface and a plated edge of the terminal show on a bottom and a side of the housing.

2. A chip electronic device according to claim 1, wherein said at least one protruded edge extends outward from the terminal and is flush with an exterior surface of said resin housing.

3. A manufacturing process of a chip electronic device with a resin housing comprising:
    forming a terminal by punching a strip into a specified shape which has a protruded edge;
    plating the formed terminal;
    mounting an electronic element onto the terminal;
    molding a resin into a housing which houses the electronic element and the terminal such that a plated lower surface and a plated edge of the terminal show on a bottom and a side of the housing; and
    separating the terminal from the strip.

4. A process according to claim 3, wherein said step of molding further includes a step of:
    forming said side of the resin housing flush with said plated edge of the terminal.

* * * * *